United States Patent [19]
Hashimoto et al.

[11] Patent Number: 5,879,302
[45] Date of Patent: Mar. 9, 1999

[54] IMAGING METHOD AND APPARATUS USING MIP PROJECTION OF DOPPLER POWER VALUES

[75] Inventors: Hiroshi Hashimoto; Shinichi Amemiya; Sei Kato, all of Tokyo, Japan

[73] Assignee: GE Yokogawa Medical Systems, Limited, Tokyo, Japan

[21] Appl. No.: 936,141

[22] Filed: Sep. 24, 1997

[51] Int. Cl.$^6$ .................................................. A61B 8/00
[52] U.S. Cl. ........................ 600/441; 600/443; 600/454
[58] Field of Search .................................. 600/453, 443, 600/441, 442; 128/916; 73/611; 367/11

[56] References Cited

U.S. PATENT DOCUMENTS

| | | |
|---|---|---|
| 4,375,671 | 3/1983 | Engle ........................................ 367/11 |
| 4,581,937 | 4/1986 | Lang et al. ................................ 73/611 |
| 5,148,809 | 9/1992 | Biegeleisen-Knight et al. ....... 600/443 |
| 5,474,073 | 12/1995 | Schwartz et al. . |

*Primary Examiner*—Marvin M. Lateef
*Assistant Examiner*—Ali M. Imam
*Attorney, Agent, or Firm*—Moonray Kojima

[57] ABSTRACT

With the intention of producing a tomographic image having information in depth direction in a short time, image data is produced from multiple tomographic images and a projection process is implemented for extracting a certain value from the image data at a corresponding position of the tomographic images, with the projection process being ended after the value of image data along the direction of projection process has passed a first threshold value and when the value comes to a second threshold value.

44 Claims, 20 Drawing Sheets

| | 15 | 14 | 01 | 14 | 03 | 14 | 05 | 14 | 07 | 14 | 09 | 14 | 11 | 14 | 13 | 14 | 15 |
|---|---|---|---|---|---|---|---|---|---|---|---|---|---|---|---|---|---|
| N↑ E← W | 14 | 14 | 01 | 14 | 03 | 14 | 05 | 14 | 07 | 14 | 09 | 14 | 11 | 14 | 13 | 14 | 15 |
| | 13 | 12 | 01 | 12 | 03 | 12 | 05 | 12 | 07 | 12 | 09 | 12 | 11 | 12 | 13 | 14 | 15 |
| | 12 | 12 | 01 | 12 | 03 | 12 | 05 | 12 | 07 | 12 | 09 | 12 | 11 | 12 | 13 | 14 | 15 |
| | 11 | 10 | 01 | 10 | 03 | 10 | 05 | 10 | 07 | 10 | 09 | 10 | 11 | 12 | 13 | 14 | 15 |
| | 10 | 10 | 01 | 10 | 03 | 10 | 05 | 10 | 07 | 10 | 09 | 10 | 11 | 12 | 13 | 14 | 15 |
| | 09 | 08 | 01 | 08 | 03 | 08 | 05 | 08 | 07 | 08 | 09 | 10 | 11 | 12 | 13 | 14 | 15 |
| | 08 | 08 | 01 | 08 | 03 | 08 | 05 | 08 | 07 | 08 | 09 | 10 | 11 | 12 | 13 | 14 | 15 |
| | 07 | 06 | 01 | 06 | 03 | 06 | 05 | 06 | 07 | 08 | 09 | 10 | 11 | 12 | 13 | 14 | 15 |
| TH2→ | 06 | 06 | 01 | 06 | 03 | 06 | 05 | 06 | 07 | 08 | 09 | 10 | 11 | 12 | 13 | 14 | 15 |
| | 05 | 04 | 01 | 04 | 03 | 04 | 05 | 06 | 07 | 09 | 09 | 11 | 11 | 13 | 13 | 15 | 15 |
| | 04 | 04 | 01 | 04 | 03 | 04 | 05 | 06 | 07 | 09 | 09 | 11 | 11 | 13 | 13 | 15 | 15 |
| | 03 | 02 | 01 | 02 | 03 | 04 | 05 | 06 | 07 | 09 | 09 | 11 | 11 | 13 | 13 | 15 | 15 |
| | 02 | 02 | 01 | 02 | 03 | 04 | 05 | 06 | 07 | 09 | 09 | 11 | 11 | 13 | 13 | 15 | 15 |
| | 01 | 00 | 01 | 02 | 03 | 04 | 05 | 06 | 07 | 09 | 09 | 11 | 11 | 13 | 13 | 15 | 15 |
| | 00 | 00 | 01 | 02 | 03 | 04 | 05 | 06 | 07 | 09 | 09 | 11 | 11 | 13 | 13 | 15 | 15 |
| | | 00 | 01 | 02 | 03 | 04 | 05 | 06 | 07 | 08 | 09 | 10 | 11 | 12 | 13 | 14 | 15 |

TH1 ↑ (at column 08)

OLD →

FIG. 19

IMAGING METHOD AND APPARATUS USING MIP PROJECTION OF DOPPLER POWER VALUES

BACKGROUND OF THE INVENTION

1. Field of the Invention

The present invention relates to a method and apparatus for image processing capable of displaying information in depth direction of multiple tomographic images.

2. Description of the Related Art

Among diagnostic imaging apparatus, the ultrasonic diagnostic apparatus transmits an ultrasonic wave to a subject body, receives reverberated ultrasonic waves from positions of different sonic impedances, processes the ultrasonic reception signals to produce a tomographic image, and displays the image for the diagnosis of the subject body The MRI apparatus utilizes the phenomenon of nuclear magnetic resonance to measure the density distribution of nuclear spin, the relaxation time distribution, etc. for the intend portion of a subject body, and produces a tomographic image of the subject body from the measured data.

The radiation CT apparatus implements the radioactive irradiation through the entire surface of the subject body, detects the radiation, and composes the detected signals to produce a frame of tomographic image.

The above-mentioned various diagnostic imaging apparatus are sometimes designed to display a three-dimensional image, and the simplest scheme for it is known to be IP (intensity projection) process.

These apparatus enables the three-dimensional observation of blood vessels, the spatial relation between the lesion and blood vessels, and the judgement of the size and nature of a tumor based on a series of projected images produced by varying the observation angle (view point) in small step, for example.

The IP process mentioned above is to produce a projected image (IP image) by extracting the largest value (or smallest value or specific value) out of pixels of all tomographic images of the subject.

In the case of the ultrasonic diagnostic apparatus, for example, which produces image data of multiple frames of images by moving the ultrasonic probe as shown in FIG. 1, a certain value of pixels is extracted along all view lines, thereby producing a frame of projected image. For extracting a certain value, the process uses a comparator as shown in FIG. 2A to compare the value of pixel in depth direction sequentially along a view line. The process of power Doppler imaging, which extracts the largest value as a projection Doppler power value, presents the relation of the Doppler power value to the depth of imaging as shown in FIG. 2B.

The IP process regarding the largest value is called MIP (maximum intensity projection) process, the IP process with regarding the smallest value is called MinIP (minimum intensity projection) process, and the IP process regarding a specific value is called specific-value IP process.

In the case of the ultrasonic imaging apparatus, for example, the MIP process regarding the largest value is effective for extracting the blood vessel wall and HV tissue such as a tumor which are displayed at a relatively high brightness, and the MinIP process regarding the smallest value is effective for extracting a tubular or hollow tissue such as a blood vessel and bile duct.

In extracting a portion such as a blood vessel based on the projection process, the MinIP process which displays a blood vessel at a low brightness is carried out. However, if there exists in another image along the same view line a pixel that is darker than the blood vessel, the darker pixel will be extracted instead of the blood vessel. On this account, the IP process involves such a problem that it is difficult to display blood vessels clearly.

Another problem is that at the extraction of a brighter portion of a blood stream in terms of a power Doppler image, particularly when the viewer intends to observe blood vessels running in the depth direction, the IP process cannot display as to which of the cross blood vessels displayed brighter is located at the front. That is, it is deficient in that positional information in depth direction is compressed and lost completely by projection.

This affair is shown in FIGS. 3A, 3B and 3C, in which the thicker-hatched portion represents the brighter portion and the thinner-hatched portion represents the darker portion in the display. With FIG. 3A and FIG. 3B showing blood vessels running at the front and rear, respectively, the above-mentioned MIP process produces a projected image as shown in FIG. 3C and fails to reveal the positional relation in depth direction of the cross blood vessels.

A similar situation is shown in FIGS. 4A, 4B and 4C, in which the thicker-hatched portion represents the brighter portion and the thinner-hatched portion represents the darker portion in the display. With FIG. 4A and FIG. 4B showing blood vessels running at the front and rear, respectively, the above-mentioned MIP process produces a projected image as shown in FIG. 4C and displays the cross blood vessels erroneously as if the brighter blood vessel in the rear is located at the front.

Similar problems also emerge in CT imaging and MR imaging. For example, a CT image of cross organs such as a bronchi and a CT image and MRI image of cross blood vessels based on contrast medium fail to reveal their spatial relation in depth direction.

SUMMARY OF THE INVENTION

Accordingly, it is an object of the present invention to provide a method and apparatus for image processing capable of producing a tomographic image having information in depth direction in a short time.

At a first viewpoint, the present invention resides in an image processing method comprising the steps of producing image data from multiple tomographic images, and implementing a projection process for extracting a certain value of the image data at a corresponding position of the tomographic images, while ending the projection process after the value of image data along the direction of projection process has passed across a first threshold value and when the value comes to a second threshold value.

The method deals with image data produced from ultrasonic tomographic images, MRI tomographic images and radiation CT images. The value of each pixel of image data is the level of brightness or the like resulting from the analysis at imaging, or it is the magnitude of echo, flow velocity, or Doppler power value in the case of the ultrasonic tomography.

This image processing method produces image data of a tomographic image based on the re-composition of NMR reception signals or CT detection signals, or the analysis of ultrasonic reception signals. The projection process for extracting a certain value is carried out for each pixel of image data of multiple frames of images thereby to produce a projected image.

In producing a projected image, the projection process is ended after the value of image data has first passed across a threshold value along the direction of the existence of the value to be extracted and when the value comes back to the threshold value, so that a certain value (largest or smallest value) located nearer to the projection process starting side (front or rear) can be detected, the projection process for the remaining positions is not performed.

Accordingly, a pixel located more frontward or rearward is detected on a priority basis, and an object which has been detected first can surely be detected inclusive of its peripheral portion. Even if there is another object having the largest or smallest value in the rear, an object at the front is detected on a priority basis, and thus information in depth direction is not lost.

Consequently, an image processing method for producing a tomographic image having information in depth direction in a short time can be accomplished.

At a second viewpoint, the present invention resides in an image processing method derived from the method of the first viewpoint, with the first and second threshold values being the same.

At a third viewpoint, the present invention resides in an image processing apparatus comprising image data producing means which produces image data from multiple tomographic images, and projection process means which implements a projection process for extracting a certain value from the image data produced by the image data producing means at a corresponding position of the tomographic images, while ending the projection process after the value of image data along the direction of projection process has passed across a first threshold value and when the value comes to a second threshold value.

This image processing apparatus can produce a tomographic image having information in depth direction in a short time in the same manner as the invention of the first viewpoint.

At a fourth viewpoint, the present invention resides in an image processing apparatus derived from the apparatus of the third viewpoint, with a certain value being the largest value.

At a fifth viewpoint, the present invention resides in an image processing apparatus derived from the apparatus of the third viewpoint, with a certain value being the smallest value.

At a sixth viewpoint, the present invention resides in an image processing apparatus derived from the apparatus of the third viewpoint, with the first and second threshold values being the same.

At a seventh viewpoint, the present invention resides in an image processing apparatus derived from the apparatus of the third viewpoint, with the first threshold value being greater than the second threshold value.

At an eighth viewpoint, the present invention resides in an image processing apparatus derived from the apparatus of the third viewpoint, which implements the projection process by using a lookup table which has addresses given in terms of values of pairs of image data to be compared during the projection process and stores output values as results of comparison in the form of a table.

This image processing apparatus is capable of implementing the projection process swiftly based on the provision of a lookup table which stores output values as comparison results in the form of a table by being addressed in terms of values to be compared in the projection process.

At a ninth viewpoint, the present invention resides in an image processing apparatus derived from the apparatus of the third viewpoint, which implements the projection process by using a lookup table which has addresses given in terms of values of pairs of image data to be compared during the projection process and stores output values as results of comparison in the form of a table, with the lookup table storing a value to be extracted in the area of table for the case of ending the projection process in response to the arrival at the second threshold value.

This image processing apparatus is designed to implement the projection process by using a lookup table which stores output values as results of comparison in the form of a table by being addressed in terms of values to be compared in the projection process so that the output value settles to data of the range for ending the projection process. Consequently, it is capable of finishing the projection process swiftly without the need of having a specialized process end judgement means.

According to the process based on the reference of table, output data (extracted data) is held and the projection process virtually completes even if the projection process goes on continuously up to the completion. The table reference process can be carried out by assigning even numbers and odd numbers to values of the range for taking a new value by the continuation of projection process and to values of the range for holding a resulting value of projection process (the projection process is quitted for the remainder).

At a tenth viewpoint, the present invention resides in an ultrasonic diagnostic apparatus including reception means for receiving ultrasonic waves from a subject body and the image processing apparatus of the third viewpoint, with the tomographic image being produced based on ultrasonic reception signals provided by the reception means.

This ultrasonic diagnostic apparatus can produce a tomographic image having information in depth direction in a short time in the same manner as the invention of the first viewpoint.

These and other features and advantages of the present invention will become more apparent from the following description of the preferred embodiments of the invention taken in conjunction with the accompanying drawings.

BRIEF DESCRIPTION OF THE DRAWINGS

FIG. 19 is a diagram explaining a specific arrangement of the lookup table used for the ultrasonic imaging process based on the eighth embodiment of this invention.

DESCRIPTION OF THE PREFERRED EMBODIMENTS

The embodiments of the present invention of the specific case of the ultrasonic tomography will be explained in detail with reference to the drawings.

(1) Embodiment 1

Figure 1:
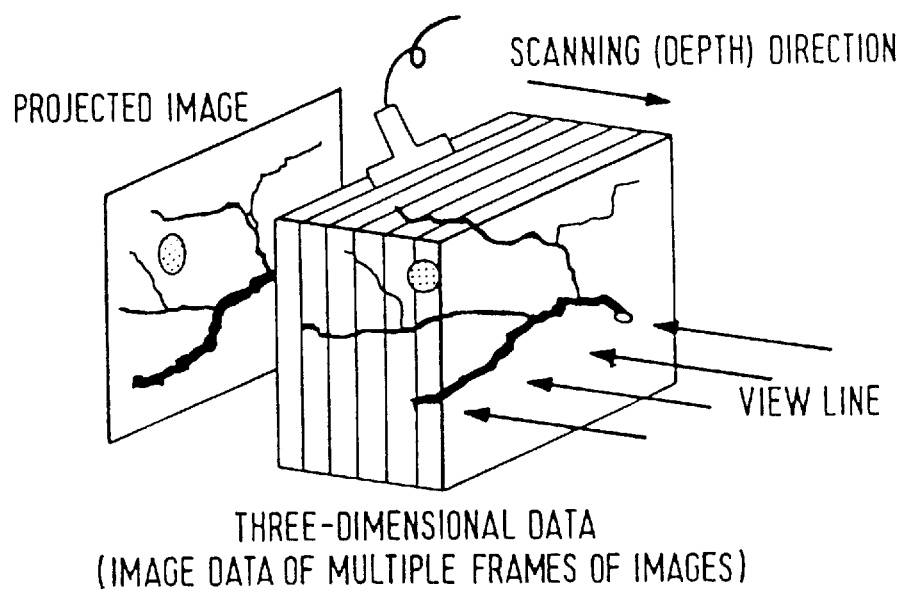
FIG. 1 is a diagram used to explain the conventional ultrasonic imaging process.
Figure 2A:
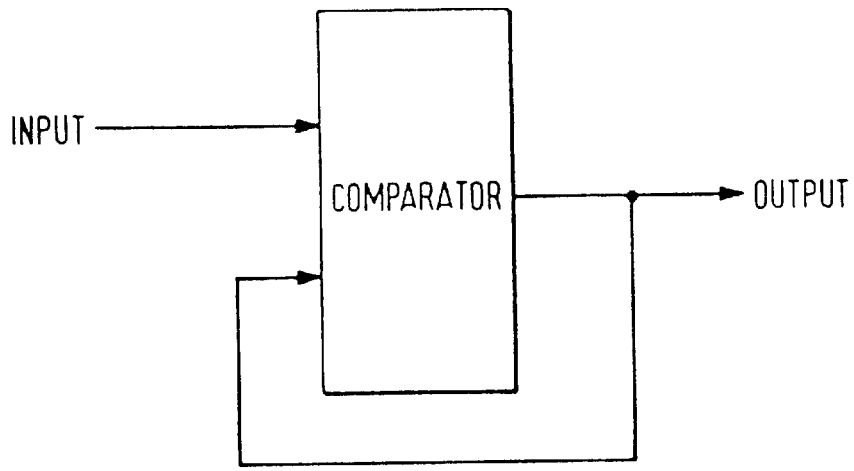
FIGS. 2A and 2B are a diagram and graph used to explain the conventional ultrasonic imaging process.
Figure 2B:
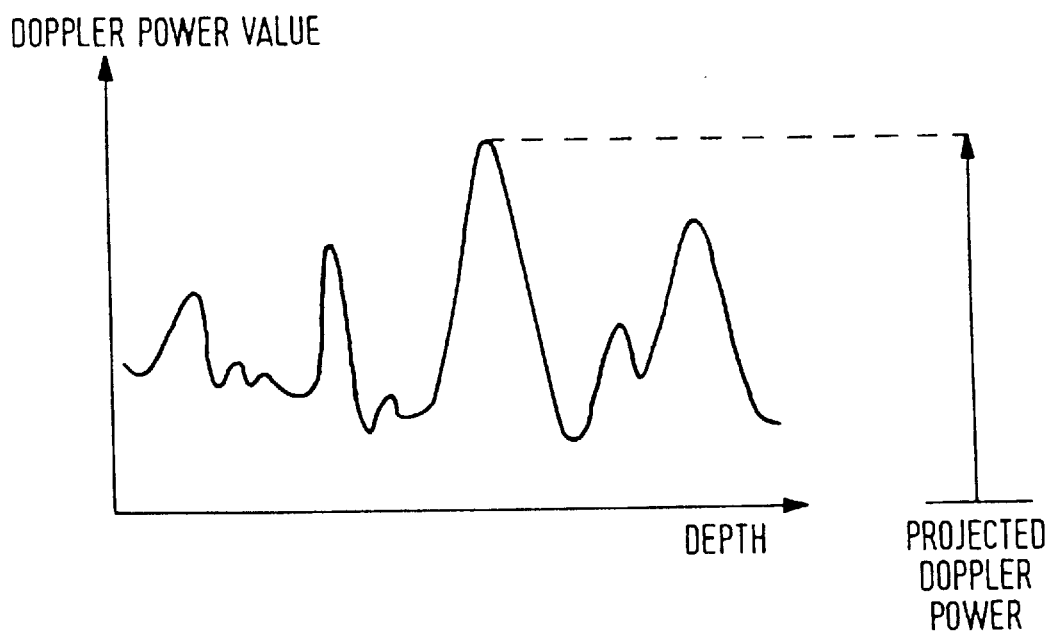
Figure 3A:
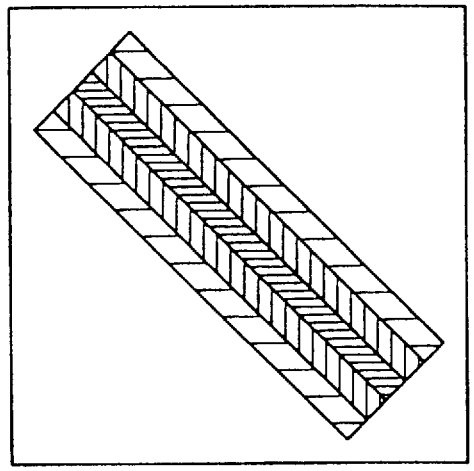
FIGS. 3A, 3B and 3C are diagrams used to explain a result of projection process of the conventional ultrasonic imaging process.
Figure 3B:
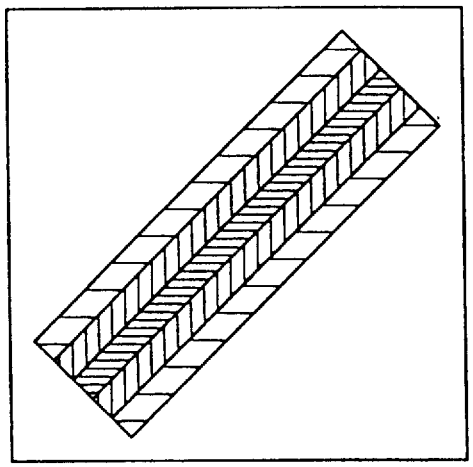
Figure 3C:
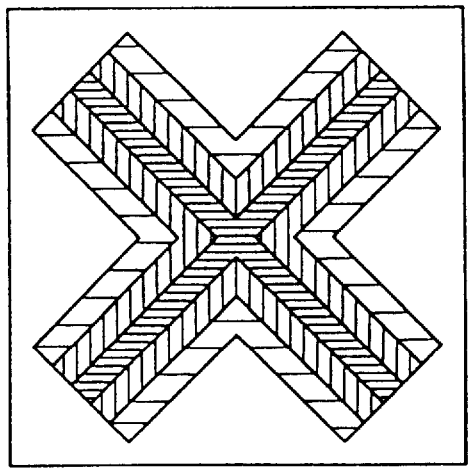
Figure 4A:
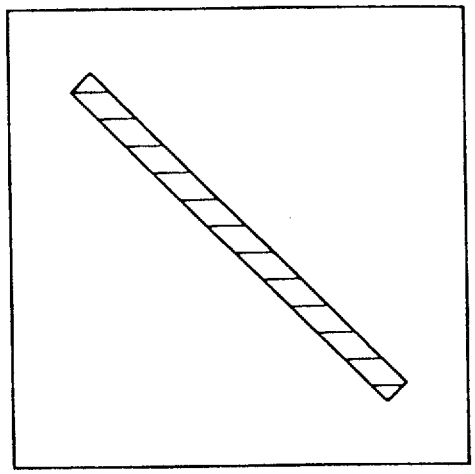
FIGS. 4A, 4B and 4C are diagrams used to explain another result of projection process of the conventional ultrasonic imaging process.
Figure 4B:
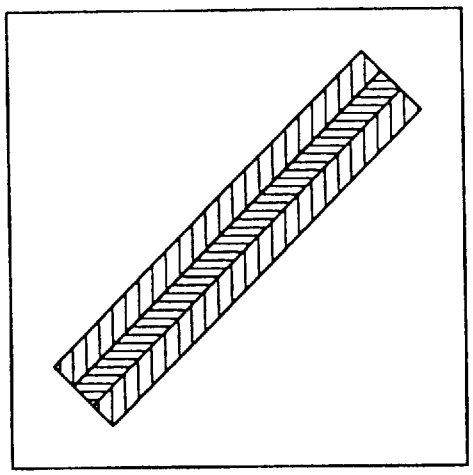
Figure 4C:
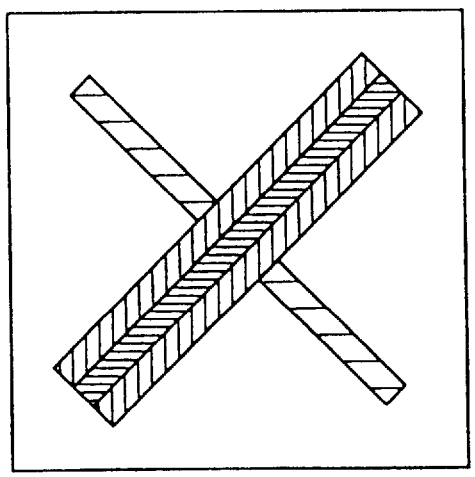
Figure 5:
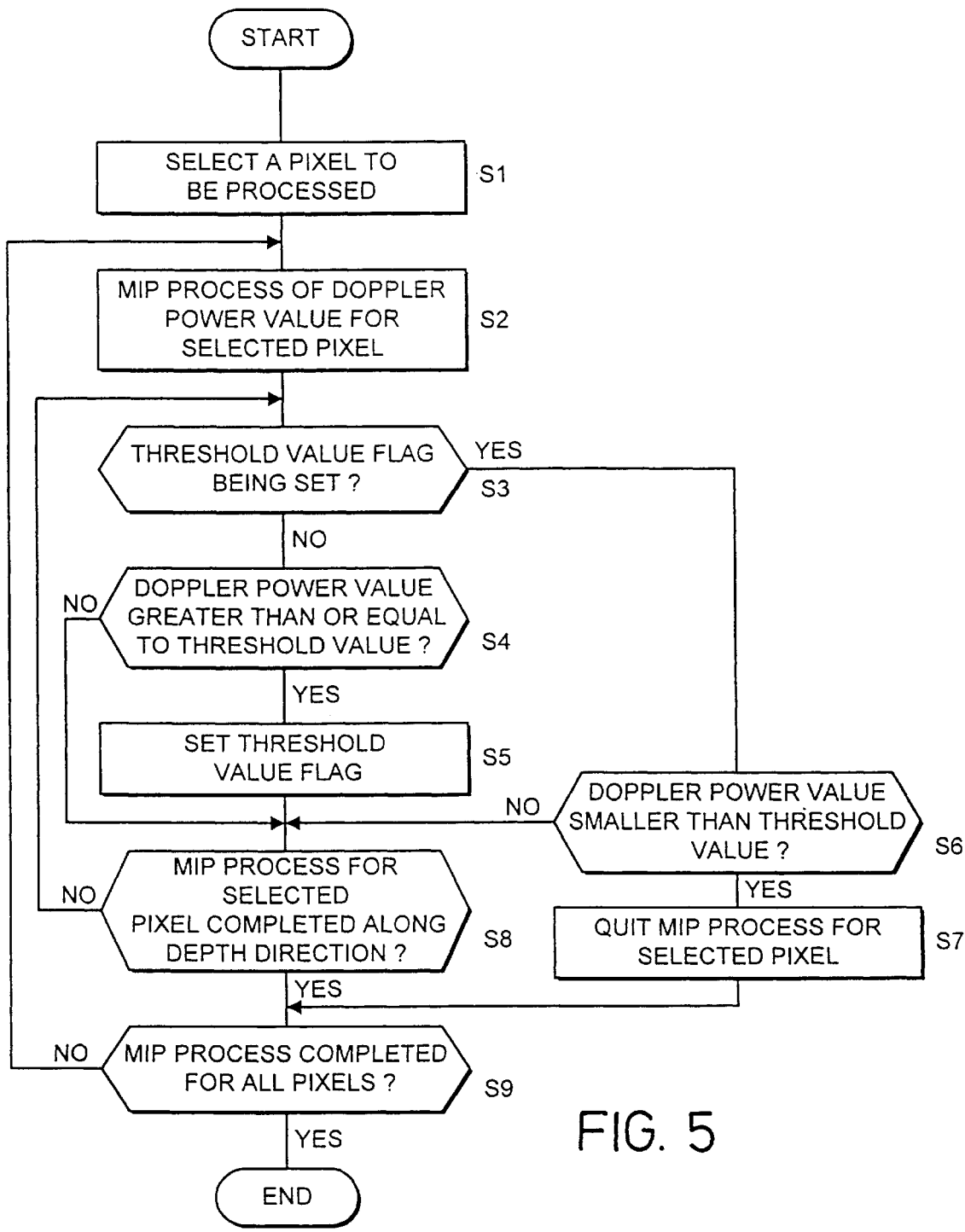
FIG. 5 is a flowchart showing the operational sequence of the image processing method based on a first embodiment of this invention.
Figure 6:
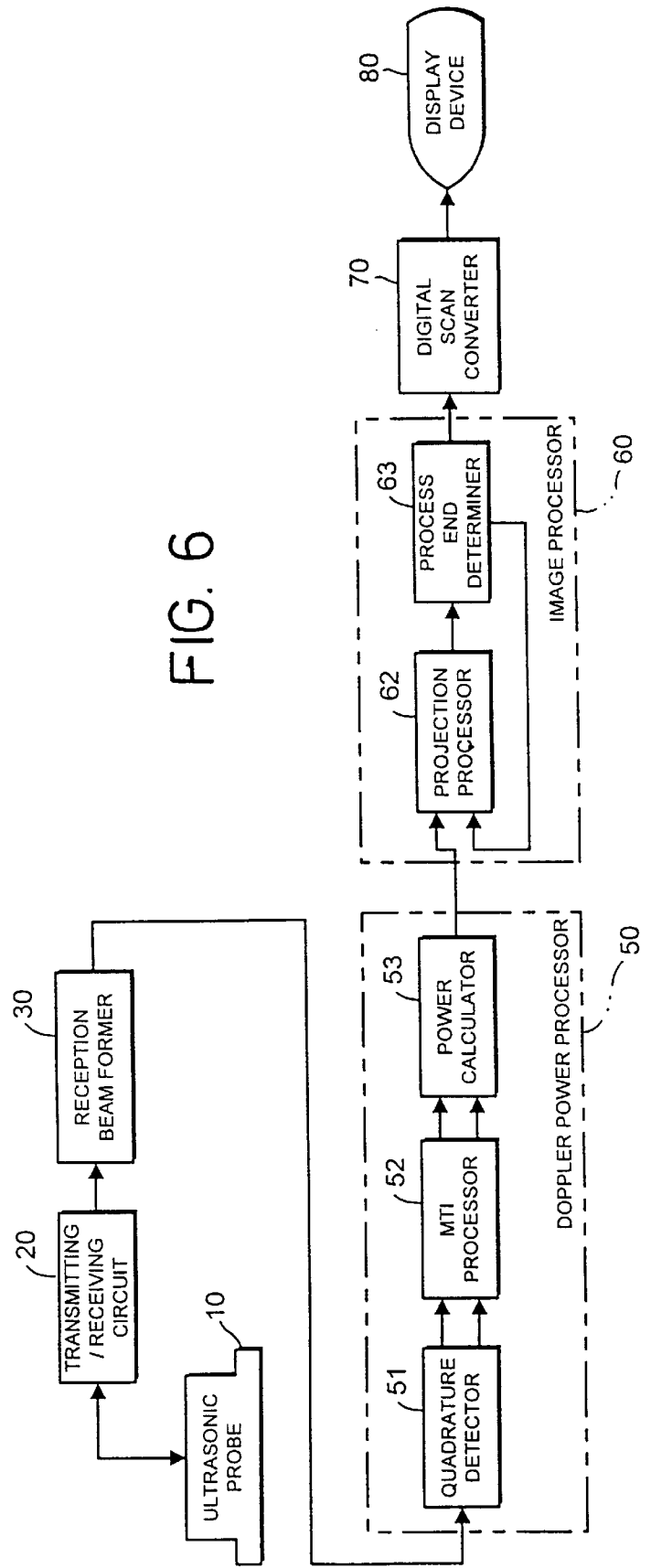
FIG. 6 is a block diagram showing the principal portions of the image processing apparatus based on the first embodiment of this invention.

FIG. 5 shows on a flowchart the operational sequence of the image processing method (ultrasonic imaging process method) based on the first embodiment of this invention. FIG. 6 shows on a block diagram the arrangement used for the image processing method based on the first embodiment of this invention, and also shows the arrangement of the image processing apparatus (ultrasonic imaging apparatus) based on the first embodiment of this invention. FIG. 7 through FIG. 10 explain the affairs of processing of this embodiment.

(1.1) Arrangement of Image Processing Apparatus (Ultrasonic Imaging Apparatus)

First, the arrangement of the ultrasonic imaging apparatus as the image processing apparatus of this embodiment will be explained with reference to FIG. 6. The ultrasonic imaging apparatus shown in FIG. 6 mainly consists of an ultrasonic probe 10, an transmitting/receiving circuit 20, a reception beam former 30, a Doppler power processor 50, an image processor 60, a digital scan converter 70, and a display device 80.

The ultrasonic probe 10 is an electro-sonic transducer which converts the electrical transmit signal into an ultrasonic wave to be sent to a subject body and receives reverberated ultrasonic waves from the subject body into electrical signals.

The transmitting/receiving circuit 20 amplifies the transmit signal to be fed to the ultrasonic probe 10 and demodulates the received echo signals based on quadrature detection or the like.

The reception beam former 30 implements the phase-matched summation of the received signals to produce a serial signal to be fed to the Doppler power processor 50.

The Doppler power processor 50 implements the quadrature detection for the serial signal to extract signals of moving objects, thereby evaluating the Doppler power value of each pixel.

The image processor 60 implements the projection process for image data of multiple frames, thereby producing a projected image. The resulting projected image is rendered the scanning frequency by the digital scan converter 70 and delivered to the display device 80, which displays the image.

The image processor 60 consists of a projection processor 62 and a process end determiner 63 as shown in FIG. 6.

The projection processor 62 implements the projection process for extracting a certain value from multiple sets of image data.

The Doppler power processor 50 consists of an quadrature detector 51 which implements the quadrature detection for the serial signal to produce an in-phase component (I component) and a quadrature component (Q component), an MTI processor 52 which extracts signals of moving objects, and a power calculator 53 which implements the Doppler calculation ($I^2+Q^2$) for the I component and Q component to evaluate the Doppler power value P, as shown in FIG. 6.

(1.2) Sequence of Image Processing (Ultrasonic Imaging Process)

The operation of the ultrasonic imaging apparatus arranged as described above and the method of ultrasonic imaging process will be explained with reference to the flowchart of FIG. 5. The embodiment shown in FIG. 5 is the case of the MIP process for extracting the largest value based on Doppler power imaging by the ultrasonic imaging apparatus.

The sequence of ultrasonic imaging process falls into the following two major steps 1 and 2.

1. Projection Process

The transmit signal amplified by the transmitting/receiving circuit 20 is fed to the ultrasonic probe 10, which converts the transmit signal into an ultrasonic wave and transmits it into a subject body (not shown).

The ultrasonic wave is reverberated and cluttered in the subject body. Part of the ultrasonic wave returns to the ultrasonic probe 10, by which it is converted back to an electrical signal (received echo signal) and fed to the transmitting/receiving circuit 20.

The received echo signal is amplified by the transmitting/receiving circuit 20, rendered the phase-matched summation by the reception beam former 30, and fed to the Doppler power processor 50.

In the Doppler power processor 50, the quadrature detector 51 separates the input signal into an I component and Q component, the MTI processor 52 extracts only signals of moving portions, and the power calculator 53 evaluates the Doppler power value P of each pixel.

Image data in terms of the Doppler power value P is produced periodically in synchronism with the transmission and reception of the ultrasonic waves. The image processor 60 receives and stores multiple sets of image data to be used for the later projection process in the memory of the projection processor 62 for example.

The projection processor 62 implements the projection process for the stored image data in the form of Doppler power values P. In this embodiment, it implements the projection process of extracting the largest value for the MIP process for extracting the portions of large Doppler power values P. Specifically, the projection processor 62 selects a pixel to be processed from image data: (step S1 in FIG. 5), and commences the MIP process of the Doppler power value P for the selected pixel: (step S2 in FIG. 5).

2. Judgement of the Ending of Process

The projection process is designed to end after the Doppler power value P of image data has first passed across a threshold value along the direction of the existence of the value to be extracted and when the value comes back to the threshold value.

Initially, it is tested for the selected pixel as to whether the threshold value flag is already set: (step S3 in FIG. 5). The threshold value flag which is a bit of a certain register is set to "1" when the selected pixel exceeds the threshold value at least once.

If the immediate Doppler power value P is greater than or equal to the threshold value, the flag is set: (steps S4 and S5 in FIG. 5), or otherwise the threshold value flag is left unchanged.

This MIP process is repeated for the selected pixel of all image data along the depth direction: (step S8 in FIG. 5).

Even in case the threshold value flag is already set, the MIP process is repeated for the selected pixel of all image data along the depth direction, provided that the immediate Doppler power value P is greater than or equal to the threshold value: (steps S6 and S8 in FIG. 5).

Otherwise, in case the threshold value flag is already set and the immediate Doppler power value P is smaller than the threshold value, the MIP process for the selected pixel is quitted: (step S7 in FIG. 5).

The MIP process goes on for the selected pixel of all image data along the depth direction, or in case the MIP process is ended in accordance with the flag judgement, another pixel of image data is selected to repeat the MIP process. In this manner, the MIP process including the process end judgement takes place for all pixels of image data: (step S9 in FIG. 5).

Figure 7:
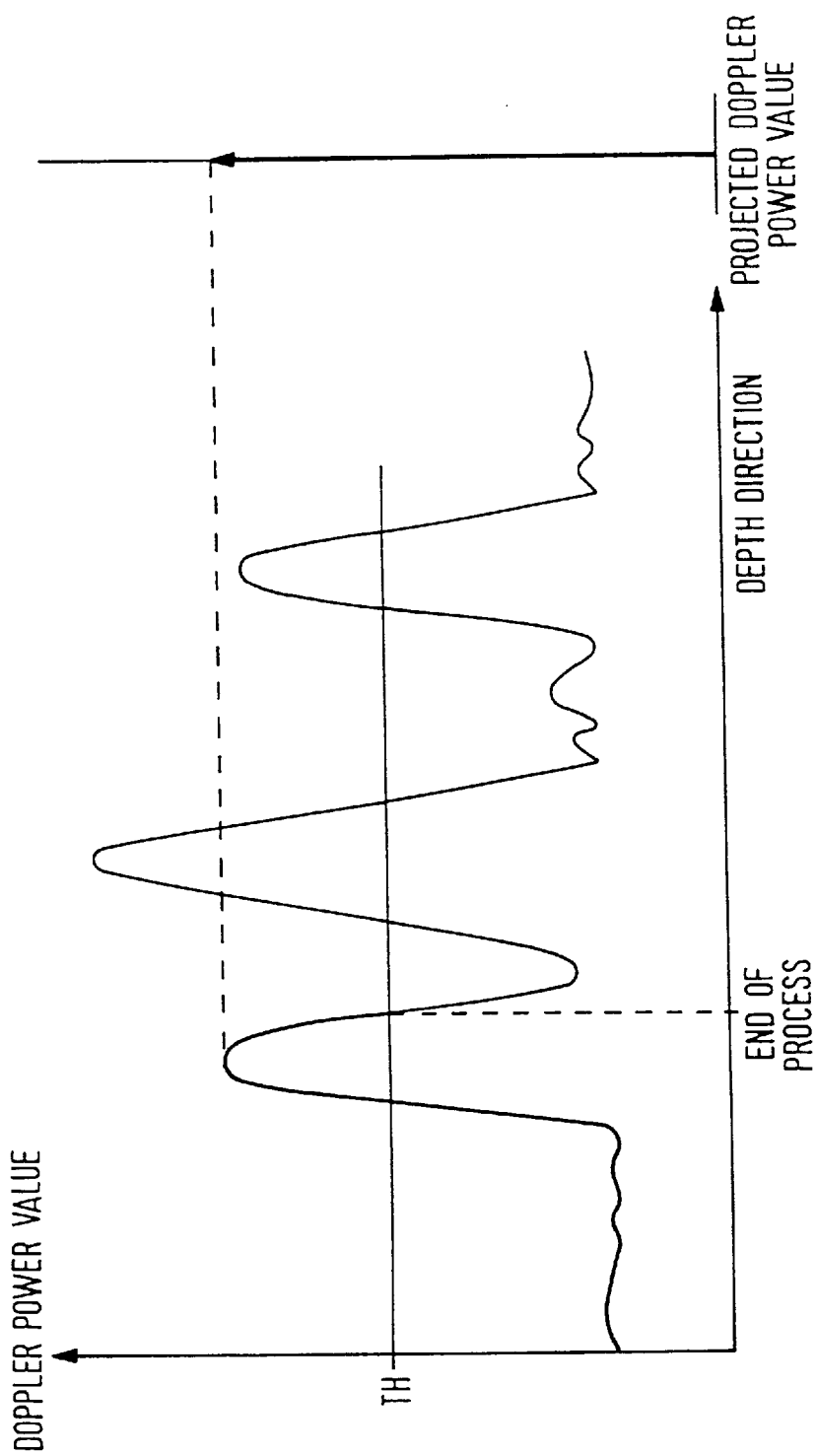
FIG. 7 is a graph used to explain the ultrasonic imaging process based on the first embodiment of this invention.

FIG. 7 depicts the foregoing process. Namely, the projection process is carried out while monitoring the Doppler power value P of image data, and the process is ended after the Doppler power value P has first passed across the threshold value TH and when it is about to pass across the threshold value TH again.

As a result of the process, the largest value detected until the end of projection process is delivered as a projected value (projected Doppler power value P). In the example shown, the peak value of the swell nearest to the process starting position (left end) is detected as projected Doppler power value P because of discontinuing the projection process for the remaining swells at deeper positions.

Consequently, it becomes possible to provide the projected Doppler power value P with information in depth direction which is based on the rule of priority on the process starting side, and to finish the process in a short time.

Figure 8A:
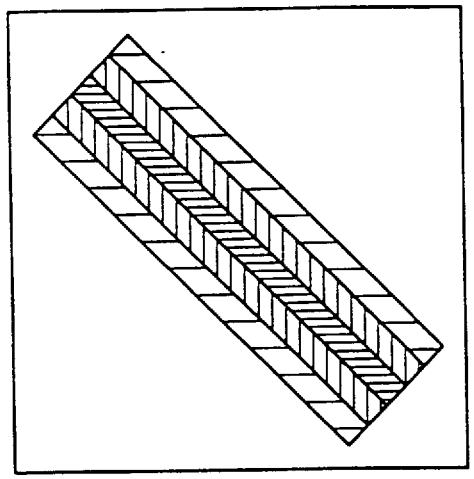
FIGS. 8A, 8B and 8C are diagrams used to explain a resulting image of the ultrasonic imaging process based on the first embodiment of this invention.
Figure 8B:
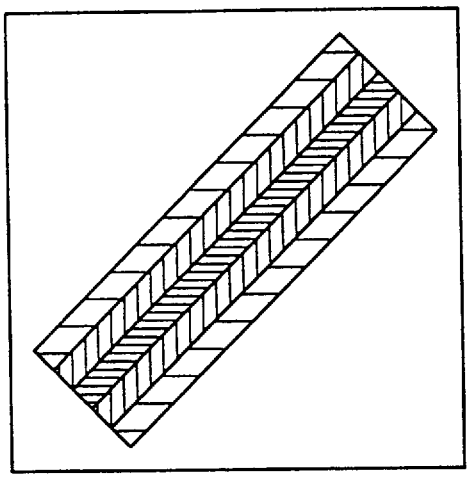
Figure 8C:
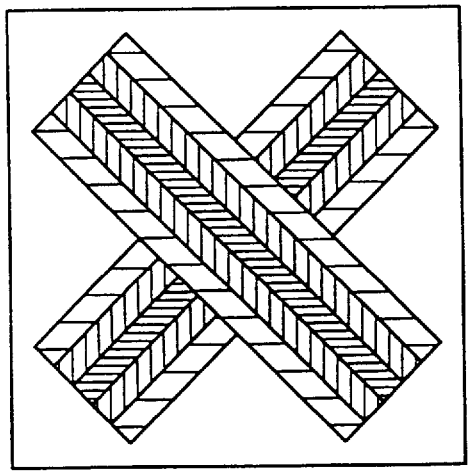

The ultrasonic imaging process described above yields a result of projection process as shown in FIGS. 8A–8C, for example. When the process is carried out for a front blood vessel shown in FIG. 8A and a rear blood vessel shown in FIG. 8B, the front blood vessel is displayed on a priority basis at the crossing of these blood vessels, with the rear blood vessel being hidden behind the front blood vessel, as shown in FIG. 8C.

Figure 9A:
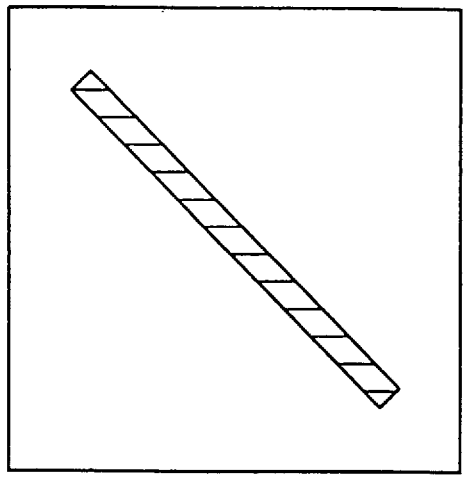
FIGS. 9A, 9B and 9C are diagrams used to explain another resulting image of the ultrasonic imaging process based on the first embodiment of this invention.
Figure 9B:
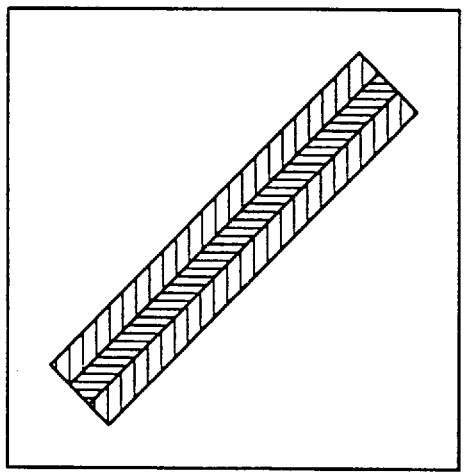
Figure 9C:
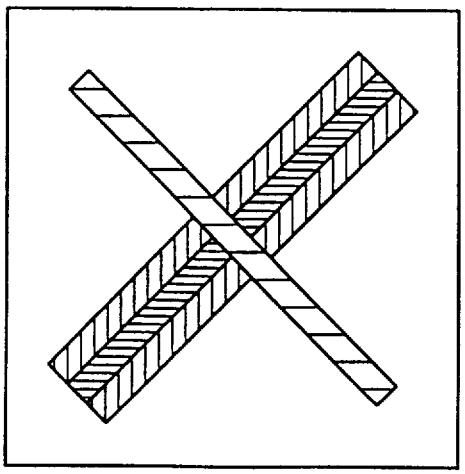

The ultrasonic imaging process described above yields a result of projection process as shown in FIGS. 9A–9C, for another example. When the process is carried out for a small, dark front blood vessel shown in FIG. 9A and a large, bright rear blood vessel shown in FIG. 9B, the front blood vessel is displayed on a priority basis at the crossing of these blood vessels, with the bright rear blood vessel being hidden behind the dark front blood vessel, as shown in FIG. 9C.

In case the projection processor 62 operates with a lookup table, in which output values of the range of the continuation of projection process and output values of the range for the ending of projection process are stored distinctively as even numbers or odd numbers, it is possible to determine the ending of process based on the parity test for one or more bits including the lowest-order bit of the output value of the projection processor 62. This scheme enables easy detection of data that belongs to the range for the ending of projection process, and swift ending of the projection process (1.3) Relation Between the Threshold Value and Displayed Image Generally, a blood stream displayed by power Doppler imaging has its Doppler power value P decreasing as the position shifts outwardly. On this account, a blood vessel is displayed in different appearances depending on the threshold value TH used for the process end judgement. This affair will be explained in connection with FIGS. 8A–8C through FIGS. 10A–10B.

(1) FIG. 8A shows a front blood vessel, FIG. 8B shows a rear blood vessel, and FIG. 8C shows a resulting projected image. In this example, the threshold value TH is set so that a blood stream to be displayed by power Doppler imaging is selected properly. Accordingly, the outer portion of the range displayed as a front portion and the portion which is hidden behind coincide with each other.

Figure 10A:
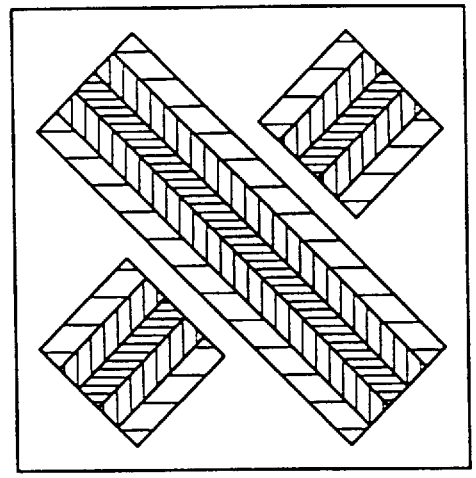
FIGS. 10A and 10B are diagrams used to explain a resulting image of the ultrasonic imaging process based on the first embodiment of this invention.

(2) FIG. 10A shows an example of the case where the threshold value TH for selecting a blood stream to be displayed by power Doppler imaging is set smaller. In this case, even if there is a smaller Doppler power value, the projection process does not take place deeply beyond that position, resulting in a display with the border of front blood vessel being emphasized.

Figure 10B:
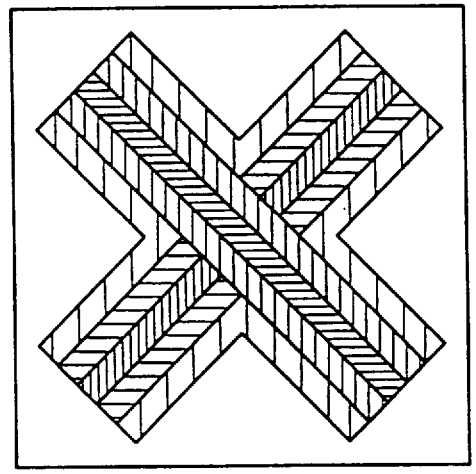

(3) FIG. 10B shows another example of the case where the threshold value TH for selecting a blood stream to be displayed by power Doppler imaging is set larger. In this case, small Doppler power values are neglected, so that only the blood streams with large Doppler power values are displayed by being emphasized.

The display result varies depending on the selection of threshold value as exemplified in the above cases (1)–(3), and therefore the threshold value TH is preset to meet the intended display result and it can also be adjusted to modify the display result.

(2) Embodiment 2

Figure 11:
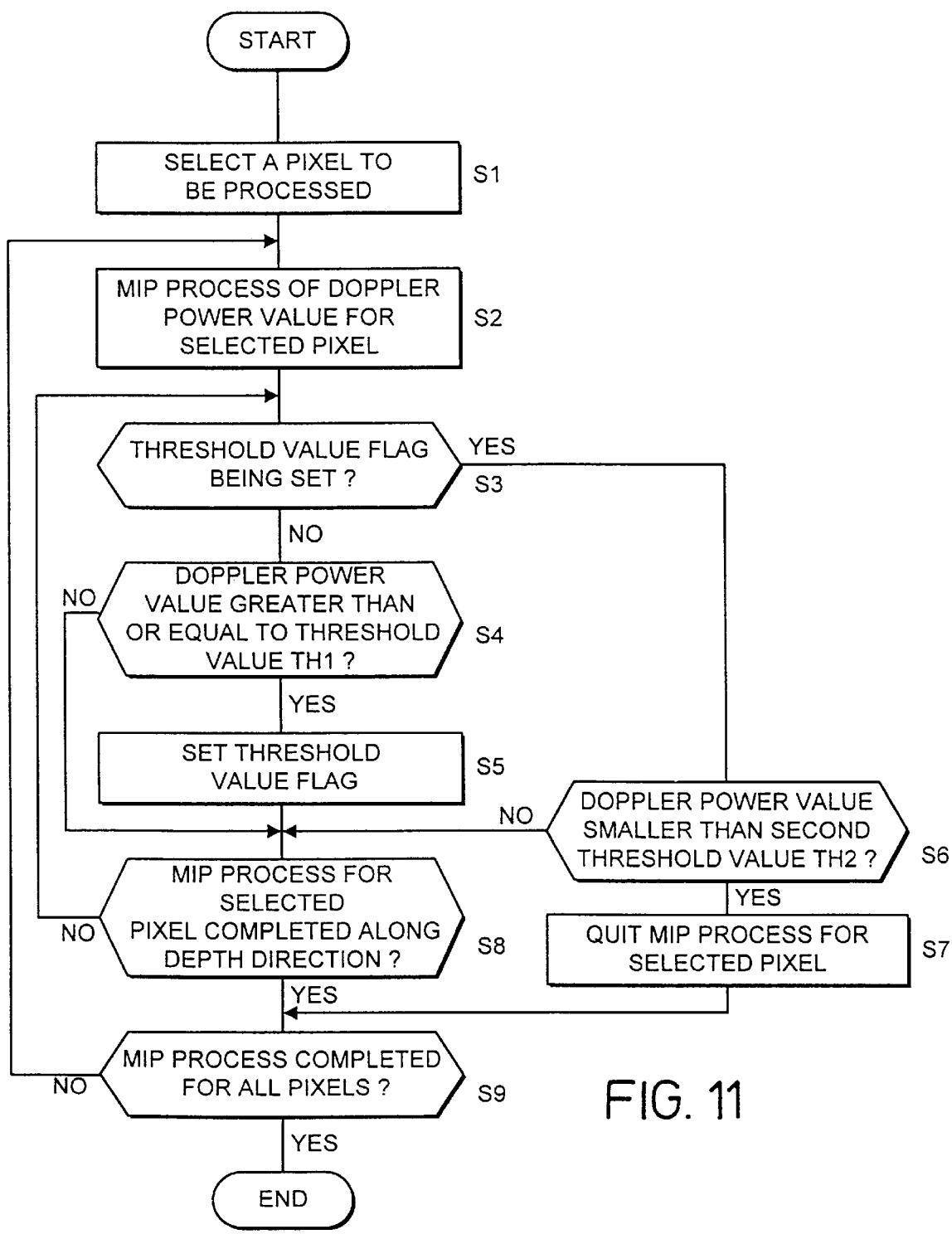
FIG. 11 is a flowchart showing the operational sequence of the image processing method based on a second embodiment of this invention.

FIG. 11 shows the sequence of MIP process for extracting the largest value based on power Doppler imaging for the Doppler power value P which includes a noise component with a virtually constant amplitude or a small motion artifact of the subject body.

Figure 12:
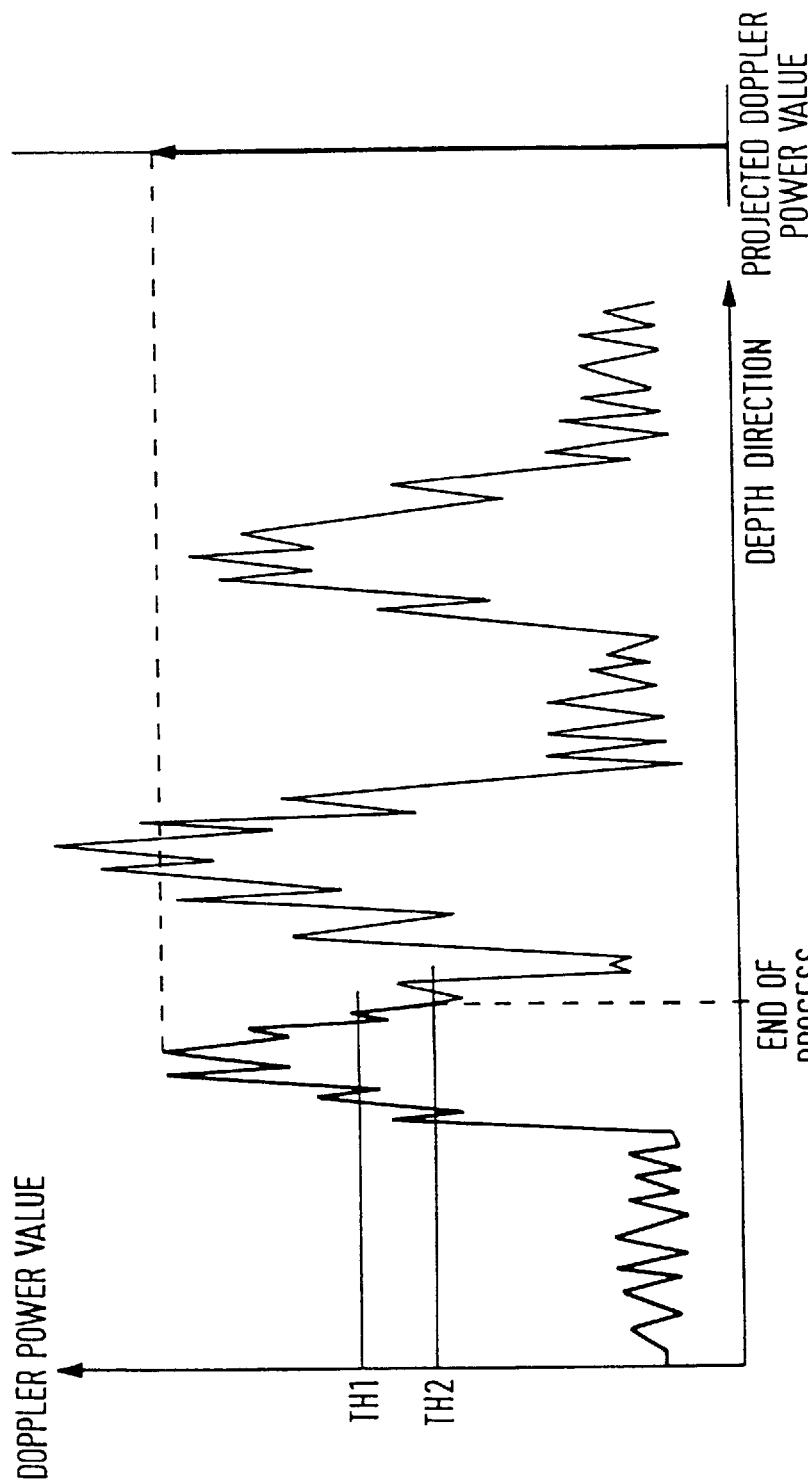
FIG. 12 is a graph used to explain the ultrasonic imaging process based on the second embodiment of this invention.

FIG. 12 explains the process in the same fashion as FIG. 7 for an example of the case where the Doppler power value P includes a certain proportion of a noise component or small motion artifact of the subject body.

The process for image data of the quality shown in FIG. 12 can possibly fail when it bases on a single threshold value TH as shown in FIG. 7. Specifically, the projection process can possibly end erroneously when it encounters a small peak attributable to the noise or artifact.

For coping with this matter, the apparatus shown in FIG. 6 operates with a first threshold value TH1 and second threshold value TH2 in place of the single threshold value TH. In the case of the MIP process for extracting the largest value, the TH1 is set greater than TH2 to provide a hysteresis function so that the process takes place stably based on the same principle as of the Schmitt circuit.

1. Projection Process

The transmit signal amplified by the transmitting/receiving circuit 20 is fed to the ultrasonic probe 10, which converts the transmit signal into an ultrasonic wave and transmits it into a subject body (not shown).

The ultrasonic wave is reverberated and cluttered in the subject body. Part of the ultrasonic wave returns to the ultrasonic probe 10, by which it is converted back to the electrical signal (received echo signal) and fed to the transmitting/receiving circuit 20.

The received echo signal is amplified by the transmitting/receiving circuit 20, rendered the phase-matched summation by the reception beam former 30, and fed to the Doppler power processor 50.

In the Doppler power processor 50, the quadrature detector 51 separates the input signal into an I component and Q component, the MTI processor 52 extracts only signals of moving portions, and the power calculator 53 evaluates the Doppler power value P of each pixel.

Image data in terms of the Doppler power value P is produced periodically in synchronism with the transmission and reception of the ultrasonic waves.

The image processor 60 receives and stores multiple sets of image data to be used for the later projection process in the memory of the projection processor 62 for example.

The projection processor 62 implements the projection process for the stored image data in the form of Doppler power values P. In this embodiment, it implements the projection process of extracting the largest value for the MIP process for extracting the portions of large Doppler power values P.

Specifically, the projection processor 62 selects a pixel to be processed from image data: (step S1 in FIG. 11), and commences the MIP process for the Doppler power value P of the selected pixel: (step S2 in FIG. 11).

2. Judgement of the Ending of Process

The projection process is designed to end after the Doppler power value P of image data has first passed across a first threshold value TH1 along the direction of the existence of the value to be extracted and when the value comes to a second threshold value TH2 (TH1>TH2).

Initially, it is tested for the selected pixel as to whether the threshold value flag is already set: (step S3 in FIG. 11). The threshold value flag which is a bit of a certain register is set to "1" when the selected pixel exceeds the first threshold value TH1 at least once.

If the immediate Doppler power value P is greater than or equal to the first threshold value TH1, the flag is set: (steps S4 and S5 in FIG. 11), or otherwise the threshold value flag is left unchanged.

This MIP process is repeated for the selected pixel of all image data along the depth direction: (step S8 in FIG. 11).

Even in case the threshold value flag is already set, the MIP process is repeated for the selected pixel of all image data along the depth direction, provided that the immediate Doppler power value P is greater than or equal to the second threshold value TH2: (steps S6 and S8 in FIG. 11).

Otherwise, in case the threshold value flag is already set and the immediate Doppler power value P is smaller than the second threshold value TH2, the MIP process for the selected pixel is quitted: (step S7 in FIG. 11).

The MIP process goes on for the selected pixel of all image data along the depth direction, or in case the MIP process is ended in accordance with the flag judgement, another pixel of image data is selected to repeat the MIP process. In this manner, the MIP process including the process end judgement takes place for all pixels of image data: (step S9 in FIG. 11).

FIG. 12 depicts the foregoing process. That is, the projection process is carried out while monitoring the Doppler power value P of image data, and the process is ended after the Doppler power value P has first passed across the first threshold value TH1 and when the value is about to pass across the second threshold value TH2.

As a result of the process, the largest value detected until the end of projection process is delivered as a projected value (projected Doppler power value P). In the example shown, the peak value of the swell nearest to the process starting position (left end) is detected as projected Doppler power value P because of discontinuing the projection process for the remaining swells at deeper positions.

The first threshold value TH1 and second threshold value TH2 are set to match with the amplitude of noise, whereby the process end judgement is not disturbed by the noise and the process can take place accurately.

Consequently, it becomes possible to provide the projected Doppler power value P with information in depth direction which is based on the rule of priority on the process starting side, and to finish the process in a short time.

(3) Embodiment 3

The preceding first and second embodiments regard the method and apparatus for image processing designed to perform the MIP process for power Doppler imaging of ultrasonic tomography. Power Doppler imaging can be replaced with B-mode imaging to perform ultrasonic imaging based on the MIP process or MinIP process explained in the first and second embodiments.

Figure 13:
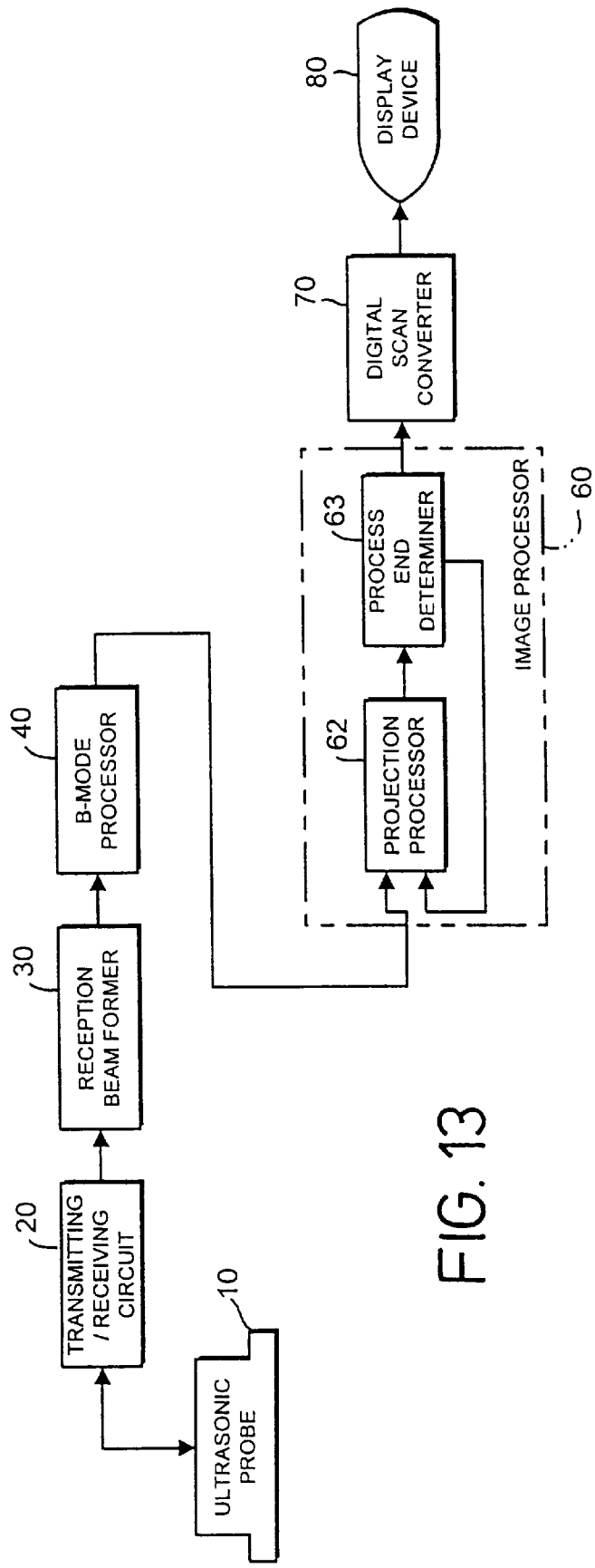
FIG. 13 is a block diagram showing the principal portions of the image processing apparatus based on a third embodiment of this invention.

FIG. 13 shows the arrangement of the image processing apparatus based on the third embodiment of this invention which is adapted to B-mode imaging. The ultrasonic imaging apparatus shown in FIG. 13 includes a B-mode processor 40, and performs the projection (MIP or MinIP) process including the process end judgement for a B-mode image produced by the B-mode processor 40.

This ultrasonic imaging apparatus performs the MIP process or MinIP process in accordance with a preset threshold value(s) in the same manner as the preceding first and second embodiments, and it becomes possible to provide the projection brightness value or echo intensity with information in depth direction which is based on the rule of priority on the process starting side for a B-mode image, and to finish the process in a short time.

The first threshold value TH1 and second threshold value TH2 are set to match with the amplitude of noise, whereby the process end judgement is not disturbed by the noise and the process can take place accurately.

(4) Embodiment 4

The preceding first and second embodiments regard the method and apparatus for image processing designed to perform the MIP process for power Doppler imaging, and the previous third embodiment is the image processing apparatus designed to perform the MIP process or MinIP process for a B-mode image.

Power Doppler imaging or B-mode imaging can be replaced with color flow mapping (CFM) to perform ultrasonic imaging based on the MIP process or MinIP process explained in the first through third embodiments.

Figure 14:
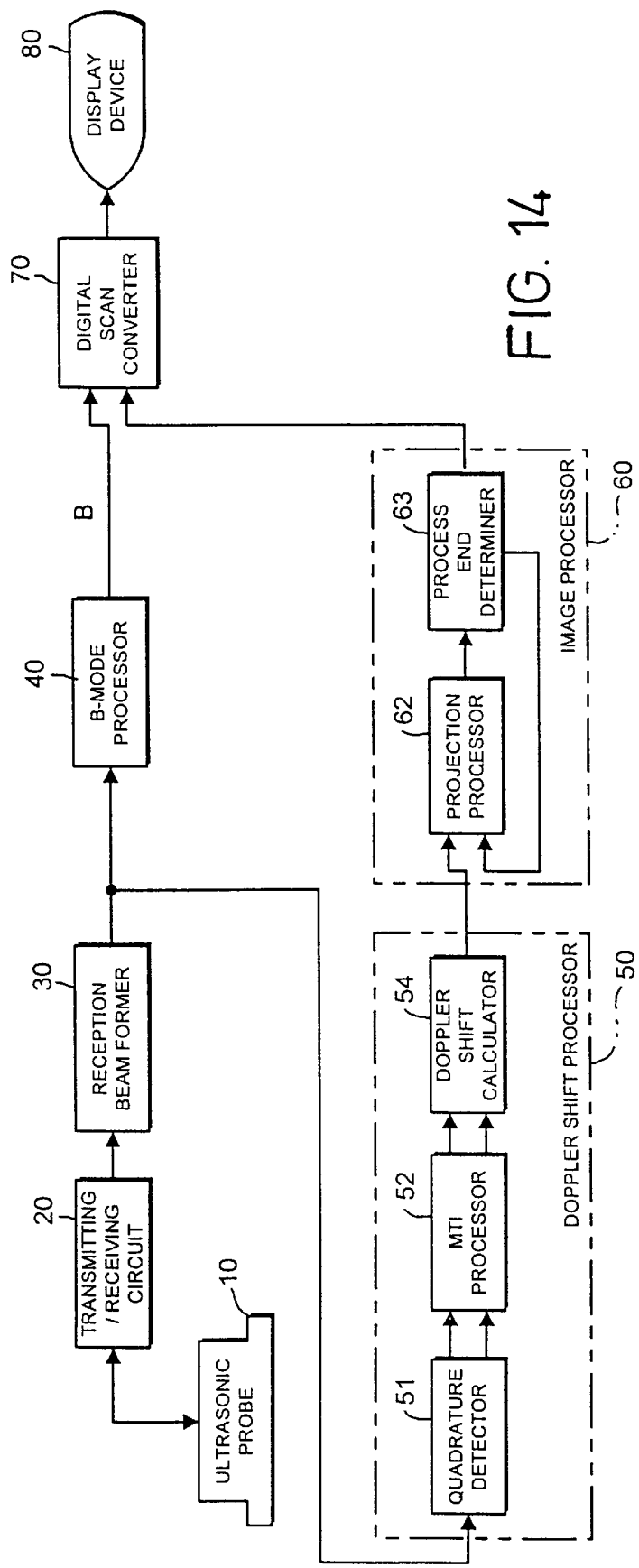
FIG. 14 is a block diagram showing the principal portions of the image processing apparatus based on a fourth embodiment of this invention.

FIG. 14 shows the arrangement of the image processing apparatus based on the fourth embodiment of this invention.

The ultrasonic imaging apparatus shown in FIG. 14 includes a B-mode processor 40 and a Doppler shift processor 50', and performs the projection (MIP or MinIP) process including the process end judgement for a Doppler shift image which reflects the flow velocity produced by the Doppler shift processor 50'. The digital scan converter 70 composes the B-mode image of quiescent objects and the Doppler shift image, and the display device 80 displays the resulting image.

This ultrasonic imaging apparatus performs the MIP process or MinIP process in accordance with a preset threshold value(s) in the same manner as the preceding first through third embodiments, and it becomes possible to provide the projected velocity value with information in depth direction which is based on the rule of priority on the process starting side for a Doppler shift image, and to finish the process in a short time.

The first threshold value TH1 and second threshold value TH2 are set to match with the amplitude of noise, whereby the process end judgement is not disturbed by the noise and the process can take place accurately.

The apparatus displays the B-mode image of quiescent objects by superimposition, allowing the observation of the periphery of moving objects.

(5) Embodiment 5

The preceding first and second embodiments regard the method and apparatus for image processing designed to perform the MIP process for power Doppler imaging, and the previous third embodiment is the image processing apparatus designed to perform the MIP process or MinIP process for a B-mode image.

Instead of displaying only a power Doppler image or only a B-mode image, it is possible to display these images simultaneously by superimposition.

Figure 15:
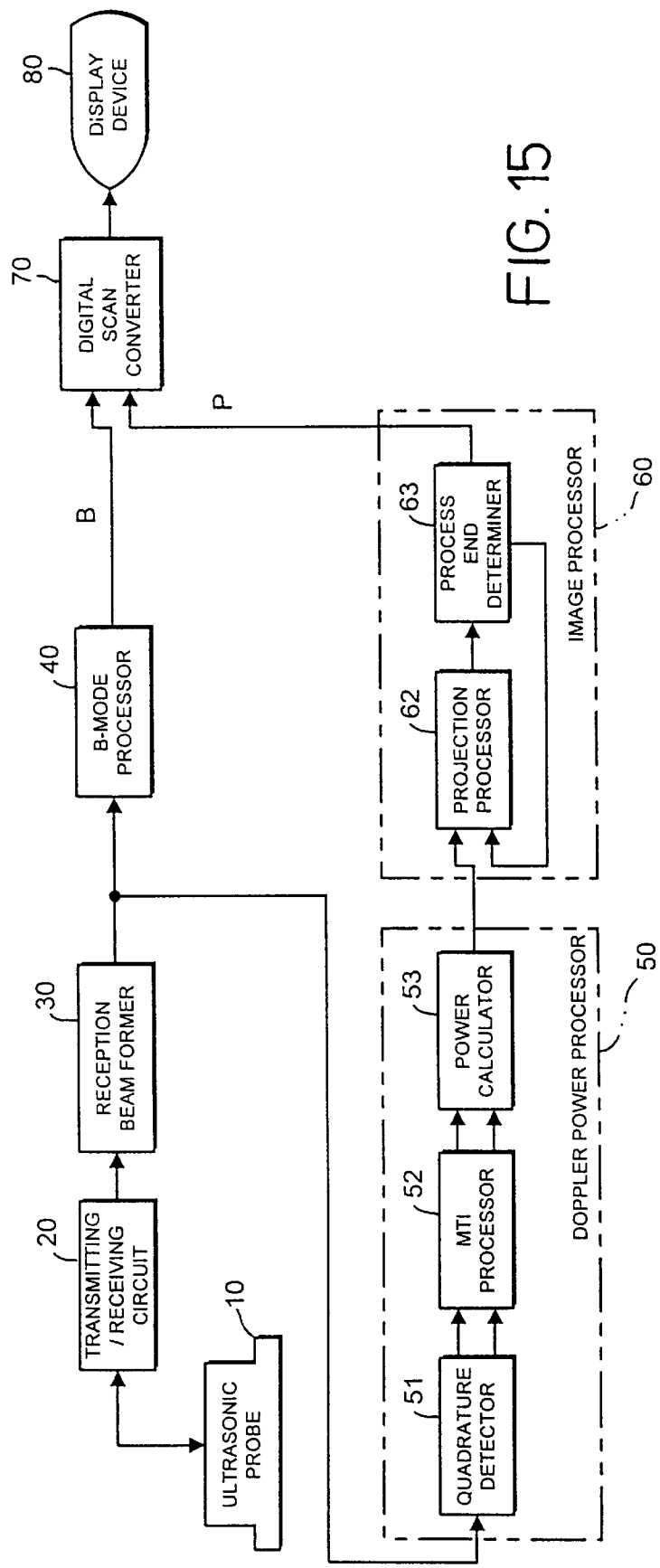
FIG. 15 is a block diagram showing the principal portions of the image processing apparatus based on a fifth embodiment of this invention.

FIG. 15 shows the arrangement of the image processing apparatus based on the fifth embodiment of this invention.

The ultrasonic imaging apparatus shown in FIG. 15 includes a B-mode processor 40 and a Doppler shift processor 50, and performs the projection (MIP or MinIP) process including the process end judgement for a Doppler power image produced by the Doppler power processor 50. The digital scan converter 70 composes the B-mode image of quiescent objects and the Doppler power image, and the display device 80 displays the resulting image.

This ultrasonic imaging apparatus performs the MIP process in accordance with a preset threshold value(s) in the same manner as the preceding first and second embodiments, and it becomes possible to provide the projected Doppler power value P with information in depth direction which is based on the rule of priority on the process starting side for a Doppler shift image, and to finish the process in a short time.

The first threshold value TH1 and second threshold value TH2 are set to match with the amplitude of noise, whereby the process end judgement is not disturbed by the noise and the process can take place accurately.

The apparatus displays the B-mode image of quiescent objects by superimposition, allowing the observation of the periphery of moving objects.

(6) Embodiment 6

Although the preceding first through fifth embodiments regard the method and apparatus for image processing relevant to the ultrasonic tomography, the inventive image processing is also applicable to the MRI tomography.

Figure 16:
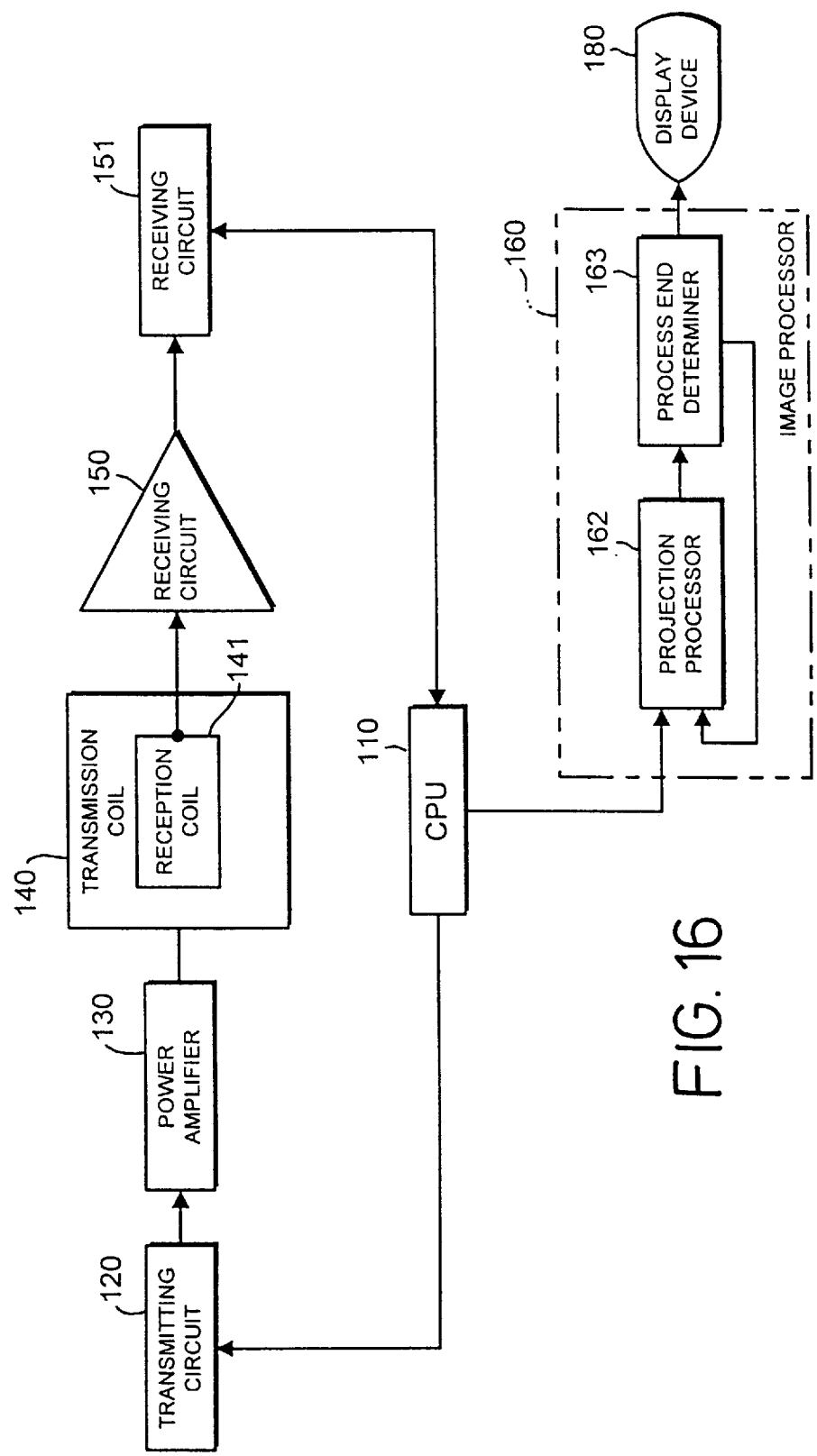
FIG. 16 is a block diagram showing the principal portions of the image processing apparatus based on a sixth embodiment of this invention.

FIG. 16 shows the arrangement of the MRI apparatus as an image processing apparatus based on the sixth embodiment of this invention.

In the MRI apparatus shown in FIG. 16, a CPU 110 controls the operation of the whole MRI apparatus and also controls signal transmission/reception and image re-composition. An transmitting circuit 120 generates a high-frequency pulse used for MRI, which is amplified by a power amplifier 130 and fed to an transmission coil 140.

At signal reception, a reception coil 141 detects a signal, which is amplified by a reception amplifier 150 and thereafter processed by a receiving circuit 151. The CPU 110 implements the image re-composition process for the received signal to produce image data of multiple tomographic images. An image processor 160 implements the MIP process for the produced image data, and a display device 180 displays a resulting image. The image processor 160 consists of a projection processor 162 and a process end determiner 163 as shown in FIG. 16.

This MRI apparatus performs the MIP process in accordance with a preset threshold value in the same manner as the preceding first embodiment, and it becomes possible to provide information in depth direction which is based on the rule of priority on the process starting side for an MRI-based tomographic image, and to finish the process in a short time.

Specifically, this embodiment utilizes the feature of the tomography of MRI apparatus, in which the brightness is high at the center of blood vessel and it falls as the position shifts outwardly, enabling the viewer to recognize the spatial (front/rear) relation of cross blood vessels.

The first threshold value TH1 and second threshold value TH2 are set to match with the amplitude of noise, whereby the process end judgement is not disturbed by the noise and the process can take place accurately.

The function of the image processor 160 can be accomplished on a software basis by the CPU 110.

(7) Embodiment 7

Although the preceding embodiments regard the method and apparatus for image processing relevant to the ultrasonic tomography and MRI tomography, the inventive imaging processing is also applicable to the CT tomography.

Figure 17:
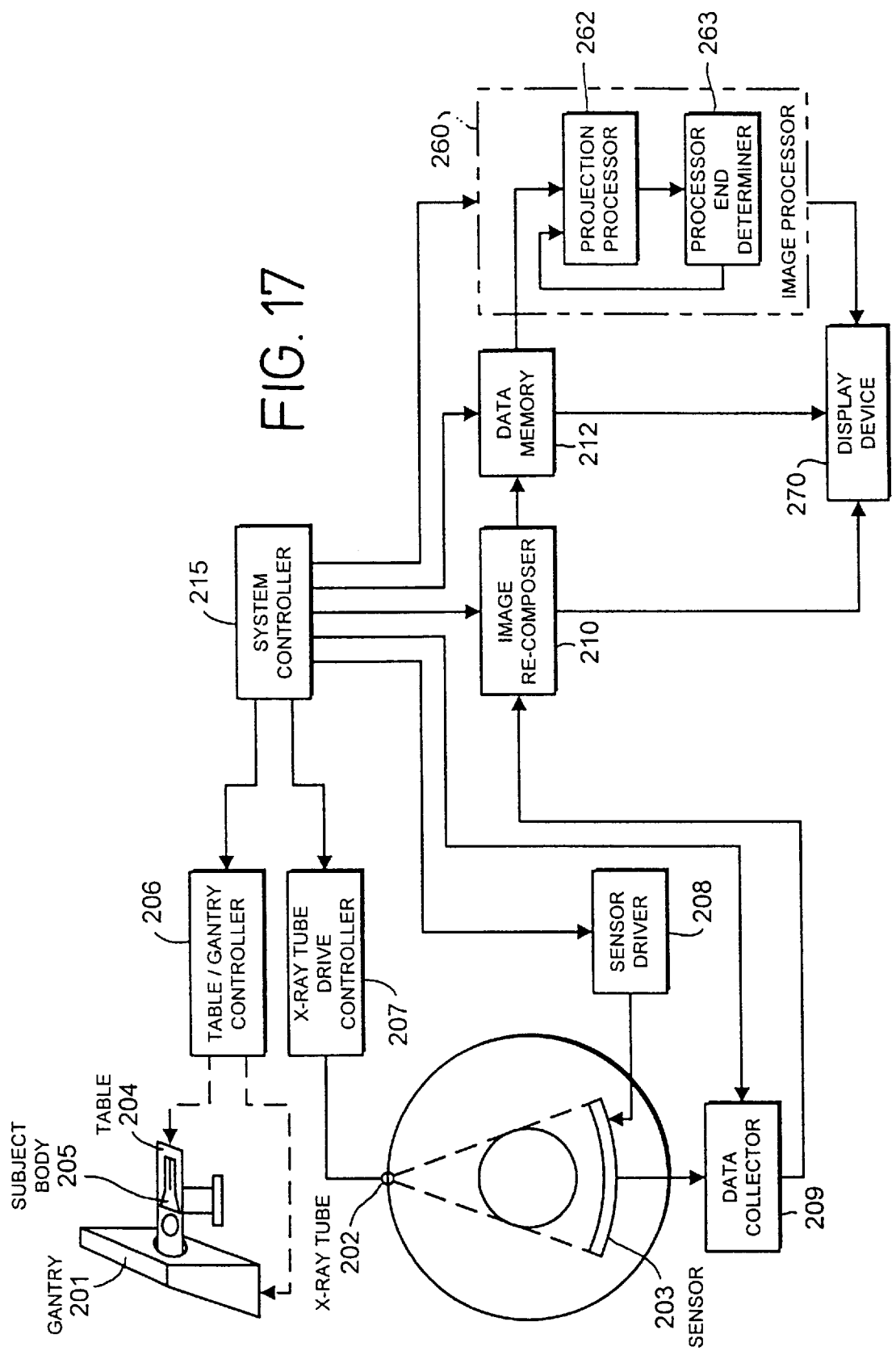
FIG. 17 is a block diagram showing the principal portions of the image processing apparatus based on a seventh embodiment of this invention.

FIG. 17 shows the arrangement of the X-ray CT apparatus as an image processing apparatus based on the seventh embodiment of this invention.

In the X-ray CT apparatus shown in FIG. 17, a gantry 201 is a mechanical section of the X-ray CT apparatus, in which an X-ray tube 202 and sensor 203 operate electrically and mechanically to scan a subject body 205 in various manners.

A table 204, with the subject body 205 being placed thereon, is moved into the gantry 201. The gantry 201 and table 204 have their tilt angle and moving distance controlled by a table/gantry controller 206. The X-ray tube 202 is controlled for the rotation and the emission of X-rays by an X-ray tube drive controller 207. The sensor 203 turns around the subject body 205 together with the X-ray tube 202 under control of a sensor driver 208.

The X-rays originating from the X-ray tube 202 and passing through the subject body 205 is detected by the sensor 203, and X-ray data is sampled by a data collector (DAS) 209. Collected data is sent to an image re-composer 210, which re-composes the input data into an image. The resulting image is displayed on a display device 270, and image data is stored in a data memory 212.

Image data is read out of the data memory 212 under control of a system controller 215 and rendered the MIP process in accordance with a preset threshold value by an image processor 260, and the resulting projected image is displayed on the display device 270. The image processor 260 consists of a projection processor 262 and a process end determiner 263 as shown in FIG. 17.

Image data of multiple tomographic images produced by data collection and image re-composition is read out of the data memory 212, and the MIP process in accordance with a preset threshold value is carried out for the data in the same manner as the preceding first embodiment. The implementation of MIP process makes it possible to provide information in depth direction which is based on the rule of priority on the process starting side for a tomographic image produced by the X-ray CT apparatus, and to finish the process in a short time.

Consequently, by utilization of the feature of X-ray CT imaging in which organs such as a bile duct are displayed darker at their outer section than the center, it enables the viewer to recognize the spatial relation of cross organs.

In addition, by utilization of the feature of the tomography assisted by contrast medium, in which the brightness is high at the center of blood vessel and it falls as the position shifts outwardly, it enables the viewer to recognize the spatial (front/rear) relation of cross blood vessels.

The first threshold value TH1 and second threshold value TH2 are set to match with the amplitude of noise, whereby the process end judgement is not disturbed by the noise and the process can take place accurately, as in the case of the second embodiment.

(8) Embodiment 8

Figure 18:
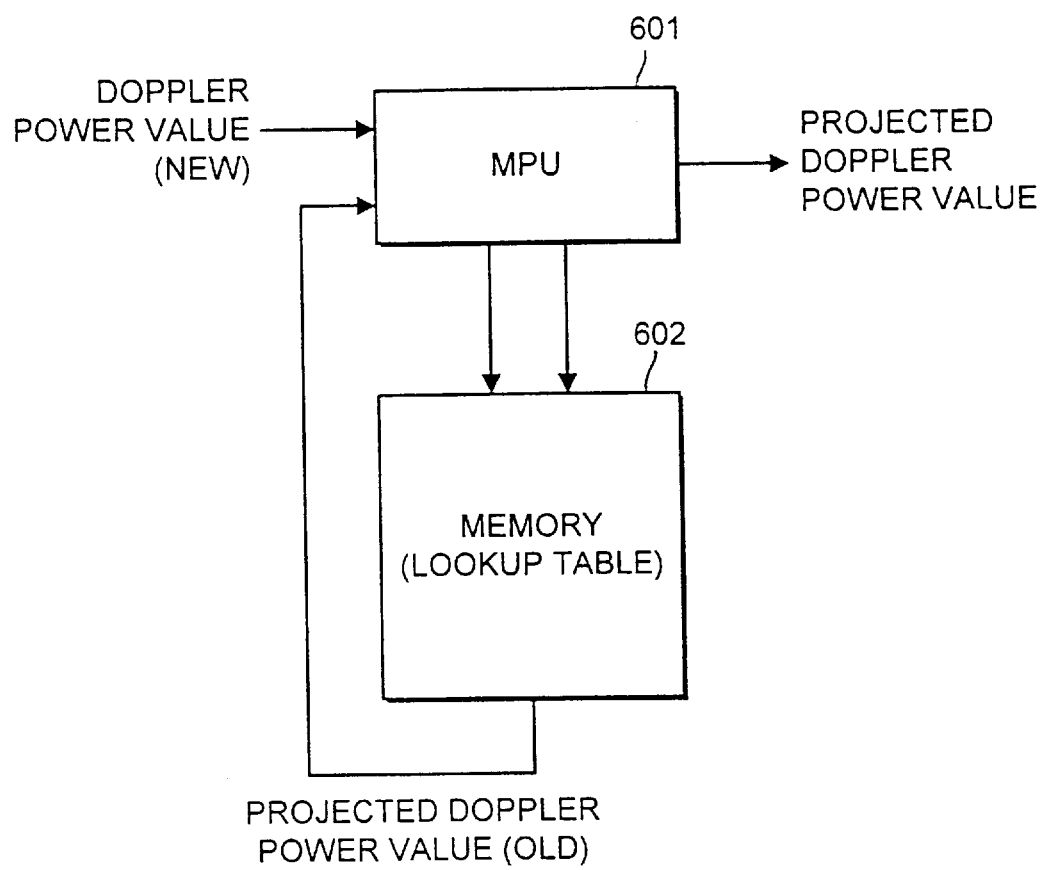
FIG. 18 is a block diagram showing the principal arrangement used for the ultrasonic imaging process based on an eighth embodiment of this invention.

FIG. 18 shows a specific hardware arrangement of the image processors 60, 160 and 260 of the foregoing embodiments.

The following explains an embodiment of the table lookup process which is intended for the speed-up of process by continuing the projection process up to the completion without the intervention of process end judgement and by holding (settling) the ending value during the process.

This embodiment is of the case where the projection process is implemented swiftly in a smaller number of steps by using table means (a memory 602 which forms a lookup table) which has addresses given in terms of values of image data to be compared and stores output values as results of comparison of image data. The image processors further include an MPU 601 for making access to the memory 602 during the projection process such as the MIP process or MinIP process.

In the case of ultrasonic imaging, for example, an input signal (NEW) of a new Doppler power value P and another input signal (OLD) of the immediately preceding Doppler power value P are given as an address of the table.

The following explains a table which stores such data that the projection process ends (data settlement) after the value of image data has first passed the threshold value along the direction of the existence of the value to be extracted (ascending direction for the MIP process or descending direction for the MinIP process) and when the value comes back to the threshold value (in the descending direction for the MIP process or ascending direction for the MinIP process). The threshold value includes a first threshold value (TH1) and a second threshold value (TH2).

This embodiment is designed to assign even numbers to values of the range where the projection process proceed to take a new value and odd numbers to values of the range where resulting values of projection process are held (projection process discontinues thereafter). Instead of assigning even numbers to values of process continuation and odd numbers to values of settlement, the assignment of even numbers and odd numbers may be exchanged. The assignment of only an even number or odd number to a value creates an error of 1, which however is negligible practically when the brightness has 64 or 256 tones.

The lookup table has the contents (output values) as follows.

(1) For OLD of Even Number

① For OLD smaller than TH1

The larger of NEW and OLD with its LSB nullified so that it is even.

② For OLD larger than or equal to TH1 a) For NEW larger than TH2

The larger of NEW and OLD with its LSB nullified so that it is even.

b) For NEW smaller than TH2

OLD added by 1 so that it is odd.

(2) For OLD of Odd Number

OLD regardless of TH1 and TH2. An output value of odd number signifies the end of process.

FIG. 19 shows a specific example of the lookup table of 16-by-16 matrix formed in accordance with the above-mentioned criterion. The Doppler power value P ranges from 0 to 15, and the TH1 and TH2 are set to be 8 and 6, respectively.

The projection process based on the above-mentioned lookup table produces output values of even numbers as the case of the above item (1) ① and next item (1) ②a, and following the case of item (1) ②b it holds the odd-numbered output value as the case of item (2), thereby implementing the rule of priority for the result of projection process for a front object. Settling output data brings the projection process to the end.

The process based on the lookup table will be explained specifically in more detail in connection with FIG. 19 and FIG. 20.

In this example, the introduced NEW takes values 04, 06, 08, 10, 08, 06, 04, 10, 12, 05, 07, 12, 13, 15 and 07 sequentially, the OLD has an initial value of 00, and the threshold values TH1 and TH2 are set to be 8 and 6, respectively.

Figure 20:
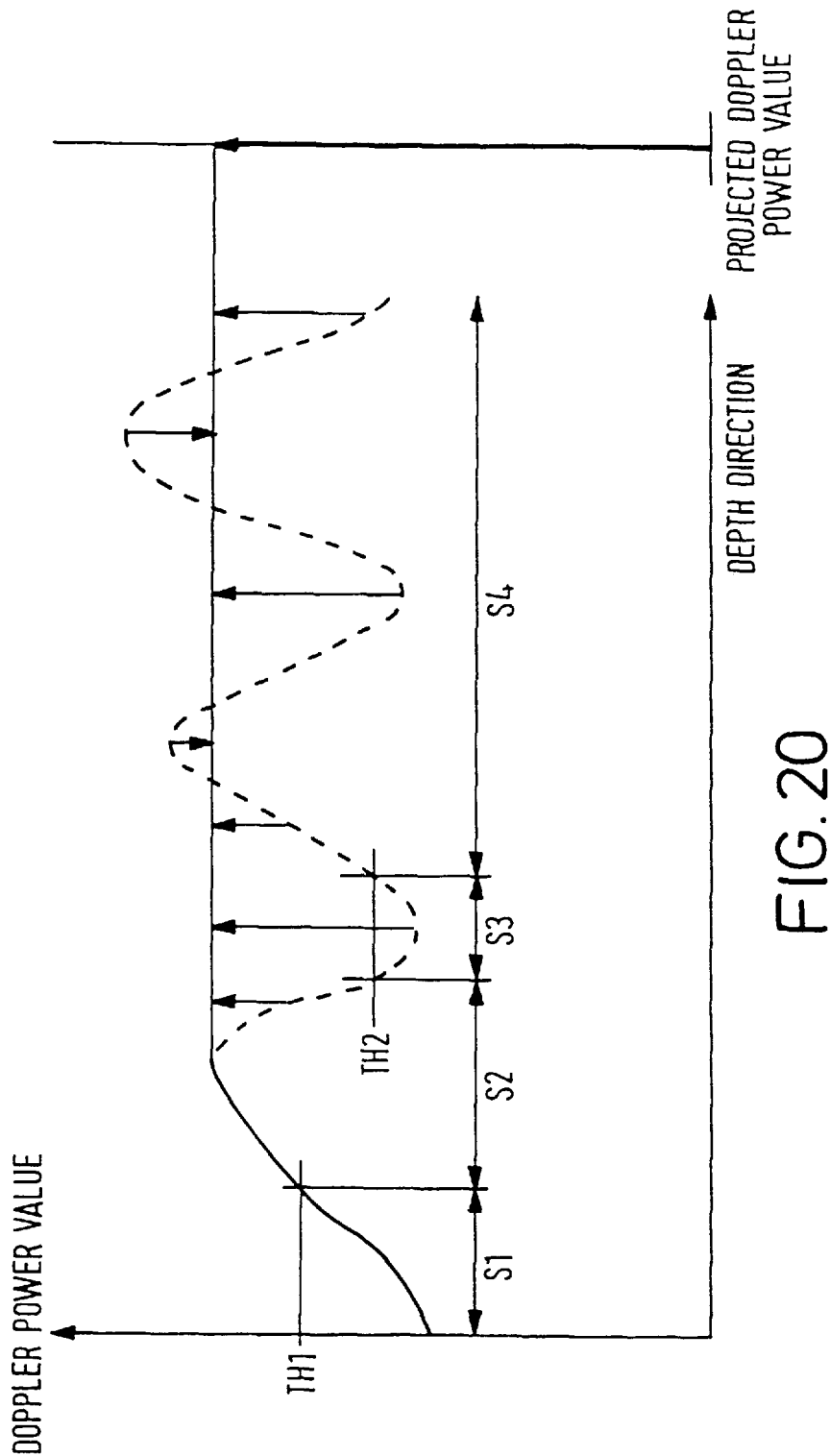
FIG. 20 is a graph used to explain the ultrasonic imaging process using the lookup table.

Step S1 produces data within the range of item (1) ① in FIG. 19 (range of S1 in FIG. 20).

NEW=04 and OLD=00 gives output 04.

NEW=06 and OLD=04 gives output 06.

NEW=08 and OLD=06 gives output 08.

Step S2 produces data within the range of item (1) ②a in FIG. 19 (range of S2 in FIG. 20).

NEW=10 and OLD=08 gives output 10.

NEW=08 and OLD=10 gives output 10.

Step S3 holds data within the range of item (1) ②b in FIG. 19 (range of S3 in FIG. 20).

NEW=06 and OLD=10 gives output 10.

NEW=04 and OLD=10 gives output 11.

Step S4 settles data within the range of item (2) in FIG. 19 (range of S4 in FIG. 20).

NEW=10 and OLD=11 gives output 11.

NEW=12 and OLD=11 gives output 11.

NEW=05 and OLD=11 gives output 11.

NEW=07 and OLD=11 gives output 11.

NEW=12 and OLD=11 gives output 11.

NEW=13 and OLD=11 gives output 11.

NEW=15 and OLD=11 gives output 11.

NEW=07 and OLD=11 gives output 11.

The output 11 is held for the largest value 10 in the range of steps 2, and the process enters the state in which the output value does not vary even if the process continues.

As a result of this process, it becomes possible for the projection process to provide the projection result with information in depth direction which is based on a certain rule, and eliminate the need of specialized hardware and software resources for the process end judgement. Based on the simple table lookup process (table calculation), the process can take place in a smaller number of steps (same number of steps as the conventional scheme).

According to this table lookup process, data to be output (extracted) is held even if the projection process continues up to the completion, and it is virtually the end of projection process.

By forming the lookup table with a RAM, flash memory, or the like, it becomes possible to revise or alter the table contents arbitrarily at arbitrary timing at the starting of the apparatus.

Although the foregoing embodiments are examples of the MIP process which extracts the largest value, they can also be applied to the MinIP process which extracts the smallest value. Extraction of the smallest value may be carried out by the MIP process based on the inversion of values.

While the present invention has been described for the specific embodiments, the invention is not limited to these embodiments, but changes and modifications can be made within the scope of the invention as defined in the appended claims.

What is claimed is:

1. A method of processing images in a depth direction, comprising the steps of:
    selecting a pixel to be processed from image data;
    commencing a maximum intensity projection (MIP) processing of selected Doppler Power value for the selected pixel;
    ending the MIP processing after the Doppler Power value has first passed a first threshold value in direction of value to be extracted and then when the value returns to a second threshold value; and
    repeating the foregoing steps of selected pixels of all image data along a depth direction, whereby accurate positional information in the depth direction is obtained.

2. The method of claim 1, wherein said first and second threshold values are the same.

3. The method of claim 1, wherein said first threshold value is greater than the second threshold value.

4. The method of claim 1, wherein the Doppler Power value selected for the MIP processing is the largest value.

5. The method of claim 1, wherein the Doppler Power value selected for the MIP processing is the smallest value.

6. The method of claim 1, wherein said MIP processing is carried out by comparing pairs of image data to values in a look-up table.

7. The method of claim 1, wherein said MIP processing is carried out using a look up table for the Doppler Power value corresponding to the first and second threshold values.

8. The method of claim 1, further comprising the steps of obtaining B-mode images of quiescent objects and displaying said B-mode images.

9. In an ultrasonic image processing apparatus comprising:
    means for transmitting an ultrasonic wave to a subject and for receiving an ultrasonic wave reflected by said subject;
    means for phase matched summing of said reflected ultrasonic wave;
    Doppler Power processing means for separating the summed wave into an I component and a Q component, and for extracting therefrom a signal of a moving portion, and for evaluating Dopper Power values of each pixel;
    image processing means for processing the Doppler Power value of each pixel; and
    means for displaying the image processed Doppler Power value; the improvement comprising:
    said image processing means comprising:
        projection processing means for storing image data in form of said Doppler Power value of each pixel, said projection processing means comprising:
            means for extracting a selected value of Doppler Power value for a maximum intensity projection (MIP) processing by selecting a pixel to be processed from image data, and
            means for commencing the MIP processing of the Doppler Power value for the selected pixel; and
        means for ending the projection processing after the Doppler Power value of image data has first passed a first threshold value and when said Doppler Power value has returned to a second threshold value.

10. The apparatus of claim 9, wherein said selected value is the largest value.

11. The apparatus of claim 9, wherein said selected value is the smallest value.

12. The apparatus of claim 9, wherein said first and second threshold values are the same.

13. The apparatus of claim 9, wherein said first threshold value is greater than the second threshold value.

14. The apparatus of claim 9, wherein said projection means comprises a look up table means having addresses of pair of image data to be compared during projection processing, and means for storing output values resulting from comparison of said look up table means addresses and said image data.

15. The apparatus of claim 9, wherein said projection means comprises a look up table means having addresses of pair of image data to be compared during projection processing, means for storing output values obtained from comparison during projection processing, and means for storing value to be extracted from another table for ending of said projection processing at said second threshold.

16. The apparatus of claim 9, further comprising B-mode image processing means for obtaining B-mode images of quiescent objects and for providing said means for displaying with said B-mode images.

17. A method of processing B-mode images in a depth direction, comprising the steps of:
    selecting a pixel to be processed from image data;
    commencing a maximum intensity projection (MIP) processing of selected B-mode value for the selected pixel;
    ending the MIP processing after the B-mode value has first passed a first threshold value in direction of value to be extracted and then when the value returns to a second threshold value; and
    repeating the foregoing steps of selected pixels of all image data along a depth direction, whereby accurate positional information in the depth direction is obtained.

18. The method of claim 17, wherein said first and second threshold values are the same.

19. The method of claim 17, wherein said first threshold value is greater than the second threshold value.

20. The method of claim 17, wherein said B-mode value selected for the MIP processing is the largest value.

21. The method of claim 17, wherein said B-mode value selected for the MIP processing is the smallest value.

22. The method of claim 17, wherein said MIP processing is carried out by comparing pairs of image data to values in a look-up table.

23. The method of claim 17, wherein said MIP processing is carried out using a look up table for said B-mode value corresponding to the first and second threshold values.

24. In B-mode image processing apparatus comprising:
means for transmitting an ultrasonic wave to a subject and for receiving an ultrasonic wave reflected by said subject;
B-mode processing means for processing the reflected waves into B-mode values of each pixel;
image processing means for processing the B-mode value of each pixel; and
means for displaying the image processed B-mode value; the improvement comprising:
said image processing means comprising:
projection processing means for storing image data in form of said B-mode value of each pixel, said projection processing means comprising:
means for extracting a selected value of B-mode value for a maximum intensity projection (MIP) processing by selecting a pixel to be processed from image data, and
means for commencing the MIP processing of the B-mode value for the selected pixel; and
means for ending the projection processing after the B-mode value of image data has first passed a first threshold value and when said B-mode value has returned to a second threshold value.

25. The apparatus of claim 24, wherein said selected value is the largest value.

26. The apparatus of claim 24, wherein said selected value is the smallest value.

27. The apparatus of claim 24, wherein said first and second threshold values are the same.

28. The apparatus of claim 24, wherein said first threshold value is greater than the second threshold value.

29. The apparatus of claim 24, wherein said projection means comprises a look up table means having addresses of pair of image data to be compared during projection processing, and means for storing output values resulting from comparison of said look up table means addresses and said image data.

30. The apparatus of claim 24, wherein said projection means comprises a look up table means having addresses of pair of image data to be compared during projection processing, means for storing output values obtained from comparison during projection processing, and means for storing value to be extracted from another table for ending of said projection processing at said second threshold.

31. A method of processing images in a depth direction, comprising the steps of:
receiving a signal from a subject being examined;
processing the received signal to produce image data of multiple tomographic images;
commencing a maximum intensity projection (MIP) processing of a selected signal value;
ending the MIP processing after the selected signal value has first passed a first threshold value in a direction of value to be extracted and then when the value returns to a second threshold value, wherein said first and second threshold values match amplitudes of noise; and
repeating the foreoging steps of selected signals of all image data along a depth direction, whereby accurate positional information in the depth direction is obtained based on rule of priority.

32. The method of claim 31, wherein said first and second threshold values are the same.

33. The method of claim 31, wherein said first threshold value is greater than the second theshold value.

34. The method of claim 31, wherein said signal value selected for the MIP processing is the largest value.

35. The method of claim 31, wherein said signal value selected for the MIP processing is the smallest value.

36. The method of claim 31, wherein said MIP processing is carried out by comparing pairs of image data to values in a look up table.

37. The method of claim 31, wherein said MIP processing is carried out using a look up table for said signal value corresponding to the first and second threshold values.

38. In an image processing apparatus comprising:
means for transmitting a signal to a subject and for receiving a signal from said subject;
means for processing the received signal to produce image data of multiple tomographic images; and
means for displaying an image of said subject from the image data obtained from said processing means; the improvement comprising:
said image processing means comprising:
projection processing means for storing said image data and comprising:
means for commencing a maximum intensity projection (MIP) processing of a selected signal from said image data; and
means for ending the projection processing after a value of image data has first passed a first threshold value and when said value has returned to a second threshold value, wherein said first and second threshold values match amplitudes of noise.

39. The apparatus of claim 38, wherein said selected value is the largest value.

40. The apparatus of claim 38, wherein said selected value is the smallest value.

41. The apparatus of claim 38, wherein said first and second threshold values are the same.

42. The apparatus of claim 38, wherein said first threshold value is greater than the second threshold value.

43. The apparatus of claim 38, wherein said projection means comprises a look up table means having addresses of pair of image data to be compared during projection processing, and means for storing output values resulting from comparison of said look up tabel means addresses and said image data.

44. The apparatus of claim 38, wherein said projection means comprises a look up table means having addresses of pair of image data to be compared during projection processing, means for storing output values obtained from comparison during projection processing, and means for storing value to be extracted from another table for ending of said projection processing at said second threshold.

* * * * *